(12) United States Patent
Riviello et al.

(10) Patent No.: US 9,076,126 B2
(45) Date of Patent: Jul. 7, 2015

(54) DOCUMENT MANAGEMENT SYSTEM

(75) Inventors: Constantino L. Riviello, New Rochelle, NY (US); Yuriy Bildeyenko, Bellmore, NY (US)

(73) Assignee: R.R. DONNELLEY FINANCIAL, INC., New York, NY (US)

(*) Notice: Subject to any disclaimer, the term of this patent is extended or adjusted under 35 U.S.C. 154(b) by 407 days.

(21) Appl. No.: 12/614,092

(22) Filed: Nov. 6, 2009

(65) Prior Publication Data

US 2010/0145904 A1    Jun. 10, 2010

Related U.S. Application Data

(60) Provisional application No. 61/198,644, filed on Nov. 7, 2008.

(51) Int. Cl.
*G06F 17/30* (2006.01)
*G06F 15/16* (2006.01)
*G06Q 10/10* (2012.01)

(52) U.S. Cl.
CPC ..................... *G06Q 10/10* (2013.01)

(58) Field of Classification Search
CPC ............ G06F 17/30569; G06F 17/30923; G06F 17/243; G06F 17/246; G06F 17/241; G06Q 40/00; G06Q 40/04; G06Q 90/00; G06Q 20/3821; G06Q 10/00; G06Q 10/06; G06Q 10/10
USPC ......... 707/608, 917, 922, 942, 944, 948, 950; 709/203, 206
See application file for complete search history.

(56) References Cited

U.S. PATENT DOCUMENTS

| | | | | |
|---|---|---|---|---|
| 6,122,635 | A * | 9/2000 | Burakoff et al. | 1/1 |
| 6,144,975 | A * | 11/2000 | Harris et al. | 715/203 |
| 6,678,698 | B2 * | 1/2004 | Fredell et al. | 707/608 |
| 6,782,387 | B1 * | 8/2004 | Kumashio | 707/608 |
| 6,957,384 | B2 * | 10/2005 | Jeffery et al. | 715/202 |
| 7,171,468 | B2 * | 1/2007 | Yeung et al. | 709/225 |
| 7,322,006 | B1 * | 1/2008 | Ohashi | 715/229 |
| 7,424,490 | B2 * | 9/2008 | Matsuishi | 1/1 |
| 7,437,366 | B2 * | 10/2008 | Matsuzawa et al. | 1/1 |
| 7,694,218 | B2 * | 4/2010 | Masuda et al. | 715/230 |
| 7,836,394 | B2 * | 11/2010 | Linder | 715/234 |
| 7,840,526 | B1 * | 11/2010 | Baltazar et al. | 707/608 |
| 7,992,771 | B2 * | 8/2011 | Yamamoto | 235/375 |
| 2002/0152254 | A1 * | 10/2002 | Teng | 709/100 |
| 2003/0037038 | A1 * | 2/2003 | Block et al. | 707/1 |
| 2005/0102212 | A1 * | 5/2005 | Roy | 705/36 |
| 2005/0125316 | A1 * | 6/2005 | Levering et al. | 705/30 |
| 2005/0160164 | A1 * | 7/2005 | Benfield et al. | 709/223 |
| 2006/0259524 | A1 * | 11/2006 | Horton | 707/201 |
| 2007/0050702 | A1 * | 3/2007 | Chopin et al. | 715/507 |
| 2007/0055596 | A1 * | 3/2007 | Yankovich et al. | 705/35 |

(Continued)

OTHER PUBLICATIONS

European Search Report dated Jan. 1, 2014.

*Primary Examiner* — Jean B Fleurantin
*Assistant Examiner* — Evan Aspinwall
(74) *Attorney, Agent, or Firm* — Hanley, Flight & Zimmerman, LLC

(57) ABSTRACT

A computer-based architecture and system provides operational control of the document management process, permitting a client seamless access to sophisticated document production operations. Direct client control over SEC compliant document management permits faster more accurate document production operations.

14 Claims, 13 Drawing Sheets

(56) References Cited

U.S. PATENT DOCUMENTS

| | | | |
|---|---|---|---|
| 2007/0078877 A1* | 4/2007 | Ungar et al. | 707/101 |
| 2008/0250157 A1* | 10/2008 | Ohata | 709/236 |
| 2008/0270312 A1* | 10/2008 | Ohata | 705/76 |
| 2009/0019358 A1* | 1/2009 | Blake et al. | 715/234 |
| 2009/0132431 A1* | 5/2009 | Magary et al. | 705/36 R |

* cited by examiner

Screen 1

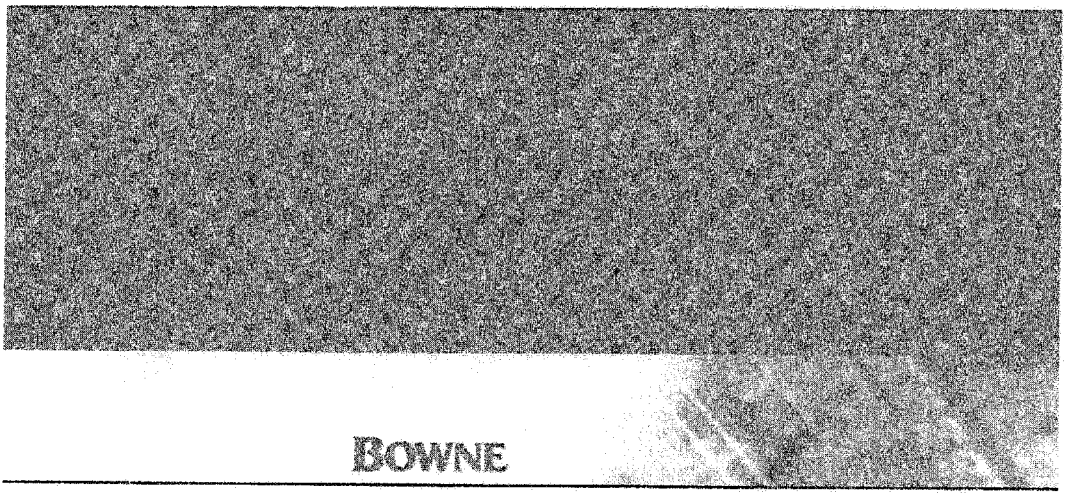

Welcome to File Upload Gateway

Email Address:                    Password:
[                    ]            [                    ]            [ Log In ]

☐ Remember me next time.                                   Forgot password

The Gateway is a secure, Web-based solution developed by Bowne that allows you to submit your job information and documents for edgarization.

If you are a new User and need to create an account or have questions about this product, please contact Bowne Customer Service at 1-866-444-4820 (pure.compliance@bowne.com). Hours of Operation: 6:00 AM EST to 6:00 AM EST, Monday-Saturday.

This Web site uses the 128 bits version of Secure Socket Layer (SSL) protocol to provide privacy between the Web browser and the secure Web server. Please make sure your web browser has SSL 3.0 turned on.

© 2008 - 2009 Bowne & Co., Inc. All rights reserved.                    Ver. 1.2.6

Figure 5

Screen 2

| | |
|---|---|
| Request Date: | 10/05/2009 |
| Requested By: | |
| *Client: | [ ▼ ] Add |
| *Client Matter: | [272 ▼ ] Add |
| *SEC Form Type: | [10-12B ▼ ] Add |
| *EDGAR Proof Due: (Eastern time) | [10/14/2009] Time: [10:30 AM] Eastern Time |
| *Filing Date: (Eastern time) | [10/21/2009] Time: [02:30 PM] Eastern Time |
| *Responsible Attorney: | [ ▼ ]<br>Phone:<br>Email: |
| Filing Coordinator: | [C ▼ ]<br>Phone:<br>Email:<br>☐ Coordinator is authorized to approve the filing |
| Email Proof To: | ☑ Responsible Attorney ☐ Filing Coordinator |
| Additional Proof recipients: | [ ] type email addresses separated by commas or semicolons |
| Message / Special Instructions: | [ ] |
| * Required | |

[ Next > ]

© 2008 - 2009 Bowne & Co., Inc. All rights reserved.                Ver. 1.2.5

Figure 6

Screen 3

EDGAR Fili...

Upload Files                                                    For Help call 1-86...

Delete  Uploaded File Names
selected

☐  Form10-K_2009-04-21.doc

☐  Law Firm Portal Review_Round 2.doc

\* [_____] [ Browse... ]

[_____] [ Browse... ]

[_____] [ Browse... ]

[_____] [ Browse... ]

[_____] [ Browse... ]

Total size of the files being uploaded should not exceed 20 MB.

\* Required

Note: If the File Name contains commas, they will be replaced with underscores (_).

[ Upload File(s) ]

[ < Back ]   [ Next > ]

© 2008 - 2009 Bowne & Co., Inc. All rights reserved.                Ver. 1.2.6

Figure 7

Screen 4

EDGAR Filing Re...

Confirmation

For Help call 1-866-444-4820

Please validate the information before pressing the "Submit" button. If you need to make corrections please click the "< Back" button.

| | |
|---|---|
| Request Date: | 10/05/2009 |
| Requested By: | |
| Client: | |
| Client Matter: | 27256.82363 |
| SEC Form Type: | 10-12B |
| EDGAR Proof Due: (Eastern time) | 10/14/2009 10:30 AM |
| Filing Date: (Eastern time) | 10/21/2009 02:30 PM |
| Responsible Attorney: | |
| | Phone: |
| | Email: s |
| Filing Coordinator: | |
| | Phone: 4 |
| | Email: |
| Filing Approval: | Coordinator is NOT authorized to approve filing |
| Email Proof To: | |
| Additional Proof recipients: | |
| File(s) to process: | Form10-K_2009-04-21.doc |
| | Law Firm Portal Review_Round 2.doc |
| Message / Special Instructions: | |

[ < Back ]  [ Cancel Request ]  [ Submit ]

© 2008 - 2009 Bowne & Co., Inc. All rights reserved.                Ver. 1.2.6

Figure 8

Screen 5

EDGAR Filing

EDGAR Submission Results

Your EDGAR Filing Request was submitted successfully.
Please refer to the Submission number below if you need to speak to Bowne Customer Service.
Thank you for using the Law Firm Portal powered by Bowne!

| | |
|---|---|
| Submission number: | 41 |
| Request Date: | 10/05/2009 |
| Requested By: | |
| Client: | |
| Client Matter: | 256.823 |
| SEC Form Type: | 10-12B |
| EDGAR Proof Due: (Eastern time) | 10/14/2009 10:30 AM |
| Filing Date: (Eastern time) | 10/21/2009 02:30 PM |
| Responsible Attorney: | |
| | Phone: |
| | Email: |
| Filing Coordinator: | |
| | Phone: |
| | Email: |
| Filing Approval: | Coordinator is NOT authorized to approve filing |
| Email Proof To: | |
| Additional Proof Recipients: | |
| Submitted File(s): | Form10-K_2009-04-21.doc |
| | Law Firm Portal Review_Round 2.doc |
| Message / Special Instructions: | |

© 2008 - 2009 Bowne & Co., Inc. All rights reserved.   Ver. 1.2.6

DOCUMENT MANAGEMENT SYSTEM

CROSS-REFERENCE TO RELATED APPLICATION

This patent application claims the benefit of U.S. Provisional Application No. 61/198,644, filed on Nov. 7, 2008, entitled Systems and Methods for Compliance Document Creation and Processing, by Constantino L. Riviello. The entire content of that provisional application is incorporated herein by reference.

INTRODUCTION

The present invention is directed to computer systems and program controlled computer operations. More particularly, the present invention is directed to sophisticated networked document management systems.

BACKGROUND

Business and corporate documents come in many shapes and sizes. Without any restriction on the scope discussed herein, computers are often used to assist in the creation and management of documents, spanning from simple documents such as newsletters and emails, to very complicated documents such as SEC compatible corporate finance filings (10 ks, etc.). Depending on the document at issue, a very sophisticated computer system may be selectively programmed to assist in the creation of a document, to manage the corrective confirmation of the document contents, update the document as needed at designated intervals, and finally submit and/or distribute the document in accordance with its intended purpose.

Computer systems play a critical role in the management of documents under the regulation of the Securities and Exchange Commission ("SEC"). Specifically, on Wednesday, Dec. 17, 2008, the U.S. Securities and Exchange Commission (SEC) approved a final rule implementing the mandated use of XBRL (Extensible Business Reporting Language) for EDGAR (Electronic Data Gathering Analysis and Retrieving) submissions. The final rule phases in use of XBRL-based submissions for collecting financial reporting information over a period of four years, eventually impacting all domestic and foreign SEC reporting companies. The need to quickly and accurately provide XBRL compliant documents has placed a significant burden on corporations in managing this process. In addition to this, many non-financial document types are created by clients from a wide spectrum of backgrounds, businesses and resources. To meet the needs of these diverse clients, a flexible document management system, accessible through one or more discrete channels is needed. The following technology has been developed to address this (and other) needs.

OBJECTS AND TECHNOLOGICAL ENHANCEMENTS

It is therefore an object of the present invention to provide a method and apparatus for enhancing the creation of selectively styled documents in accord with predetermined requirements.

It is a further object of the present invention to provide a computer system programmed to assist in the document creation and management process for highly specialized business documents.

It is yet another object of the present invention to provide a computer interconnect bridge so that the document creation and distribution process is both secure and precise.

It is still a further object of the present invention to provide computer system architecture for supporting the secure and client customized preparation of select documents.

The above and other objects of the present invention are realized in a specific illustrative embodiment thereof, described below in connection with the following drawings.

BRIEF DESCRIPTION OF THE FIGURES

For a more complete understanding of the specific embodiments, FIGS. 1-11 are provided as illustrations relating to the practice of the present invention, wherein:

FIG. 1 is a functional block diagram for a computer-based document management system;

FIG. 2 is a system depiction of the network-based computer system used in the subject invention;

FIG. 3 is a process workflow diagram;

FIG. 4 is a system architecture diagram;

FIG. 5 is a screen image for the opening/welcome screen from the Web Portal;

FIG. 6 is a data entry screen image;

FIG. 7 is a further data entry screen image;

FIG. 8 is a data confirmation screen image;

FIG. 9 is an order confirmation screen for an illustrative system corresponding to the present invention;

FIG. 10 is a data entry screen for a distributable application for facilitated client entry of document control instructions;

FIG. 11 is a screen display of an Outlook-based email transmission of document control instructions;

FIG. 12 is a screen display for the data entry field used with a client-based application.

DESCRIPTION OF THE INVENTION AND ILLUSTRATIVE EMBODIMENTS THEREOF

The present invention can be accomplished in one or more techniques that include program controlled computers, selective data storage and computer processing steps on a data set representing attributes of a document. In a general sense, document management involves at least two aspects. The first aspect is document creation and this involves the selective arrangement of the content within a document framework. The creation process is, of course, dominated by the dictates of the document and its ultimate commercial purpose.

The second aspect of the document management process involves document formatting, publication and distribution. This aspect of the management process is directed to insuring that the content is conformed to particular standards and requirements, proofed for accuracy and otherwise formatted for its final purpose.

Figure 1:
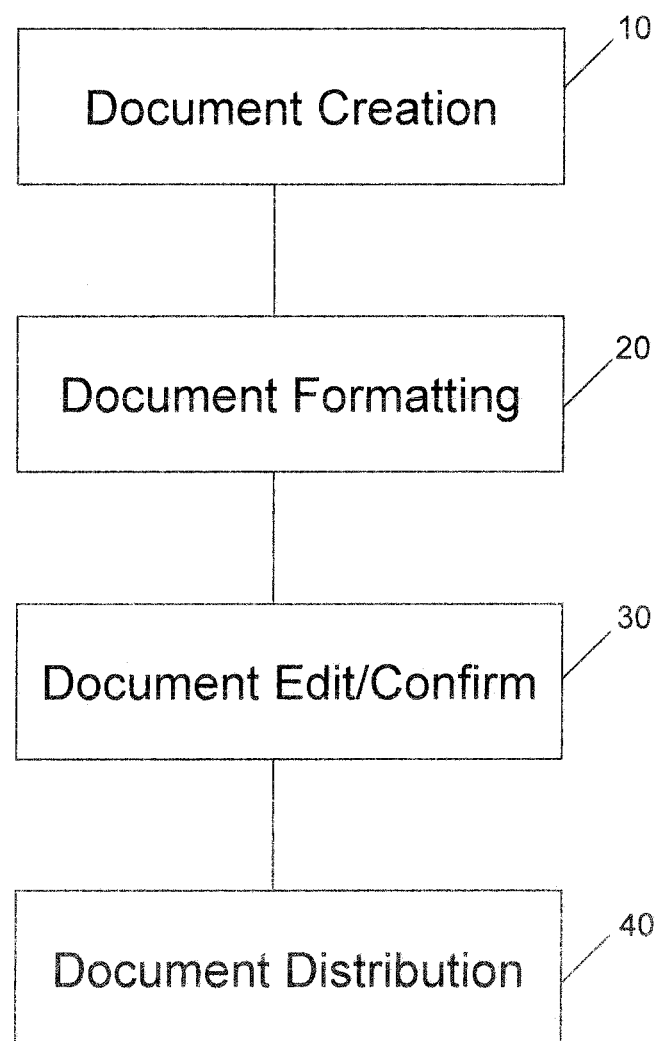

FIG. 1 depicts generally the document management systems implicated by the present invention and thus represents an illustrated embodiment of the invention in general terms. In particular, the Document Management System (DMS) is formed by one or more of the following hardware components: module 10—document creation; module 20—general formatting; and module 30—final edit and confirm. The last module involves document distribution. (Block 40).

In the foregoing discussion, the DMS is presented as a unitary operation practiced by a single entity. In many instances, however, document processing is sufficiently complex that individual elements within the DMS process flow are separately managed. In fact, because of the specialized nature of document production management, many companies offer this as a specialized service. In this way, companies, such as publicly traded corporations, create and collect core business data, organize this data to conform the industry standards and then retain a second firm to package and produce the business data in conformed documents.

To illustrate this, consider the process for creating a corporate annual report for company XYZ listed on the New York Stock Exchange (NYSE). The report is created by collecting corporate financial records regarding profitability, sales and related data and organizing the data in accord with accepted accounting principles that permit shareholders to ascertain corporate financial health. Because of the highly regulated environment governing such financial reporting the document creation process is highly specialized. More recently, the process involves software supported creation tools including protocols such as XBRL, now mandated for all publicly trading corporations. In this regard, systems have been designed to facilitate the corporate document generation process. In the case of the XYZ corporation, data is transmitted to a second, separately managed facility that provides services to coordinate the proper formatting, tagging and dissemination of the resulting documents, including timely filing with the SEC. This division, along specialization and skill set, enhances productivity.

The XBRL protocol for tagging financial records is a powerful tool that, when properly implemented, can save time and resources. Assignees to the present invention have developed a XBRL platform that works in conjunction with the technology presented herein. This platform is disclosed in U.S. patent application Ser. No. 12/410,017 titled "Methods, Systems and Software for Processing Financial Documents." filed on Mar. 24, 2009, the contents thereof are incorporated herein by reference.

Figure 2:
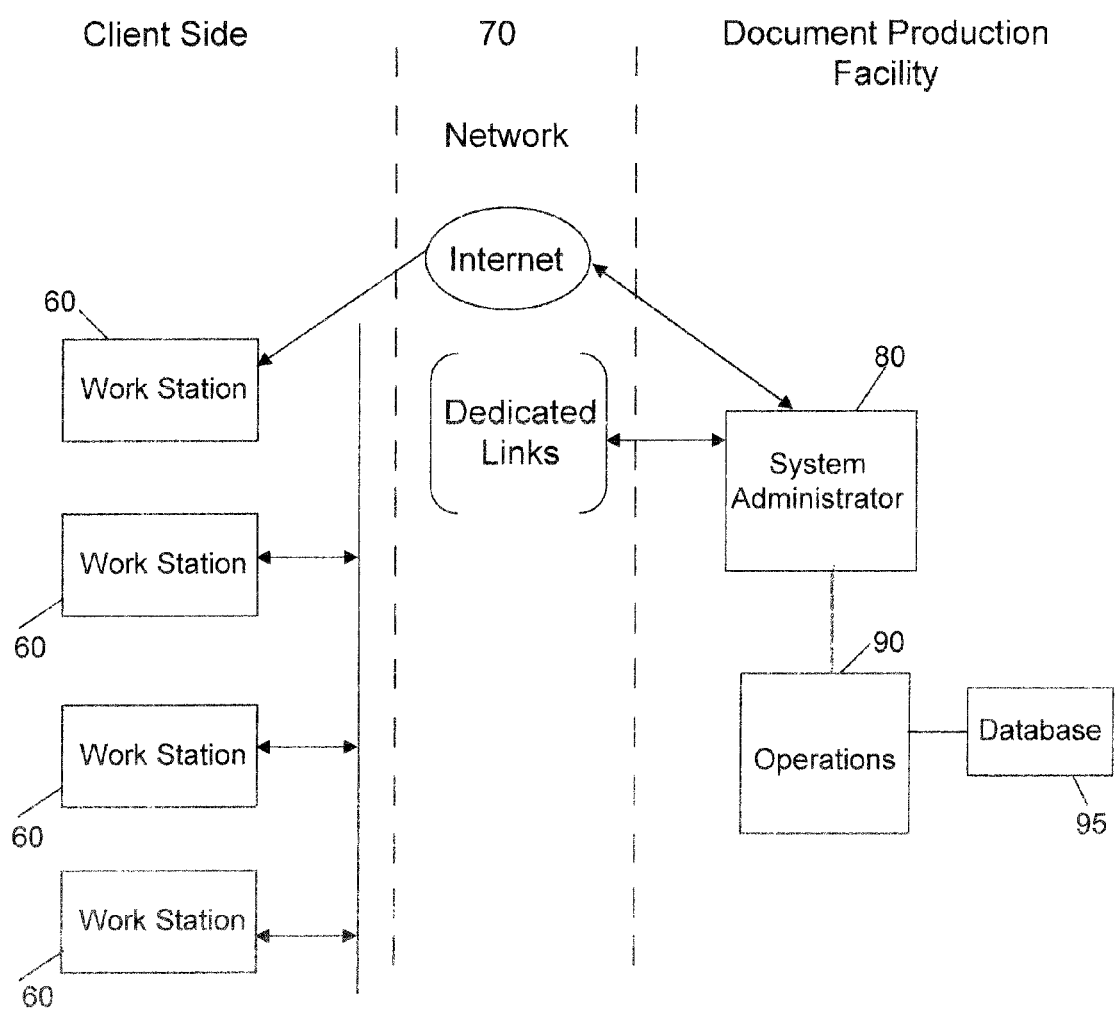

In FIG. 2, the basic computer system and network environment for implementing the DMS operation is disclosed. In particular, a plurality of clients use workstations to aggregate key data elements for inclusion into one or more formalized document styles, block 60. Once created, these data files are passed along a network connection 70 to the specialized production facility and facility administrator module 80. Properly secured channel communication may be by Internet or dedicated link, and is managed in part by the system administrator 80. Once properly confirmed, data moves into the production systems 90, with associated database 95 for internal records management and retrieval.

Figure 12:
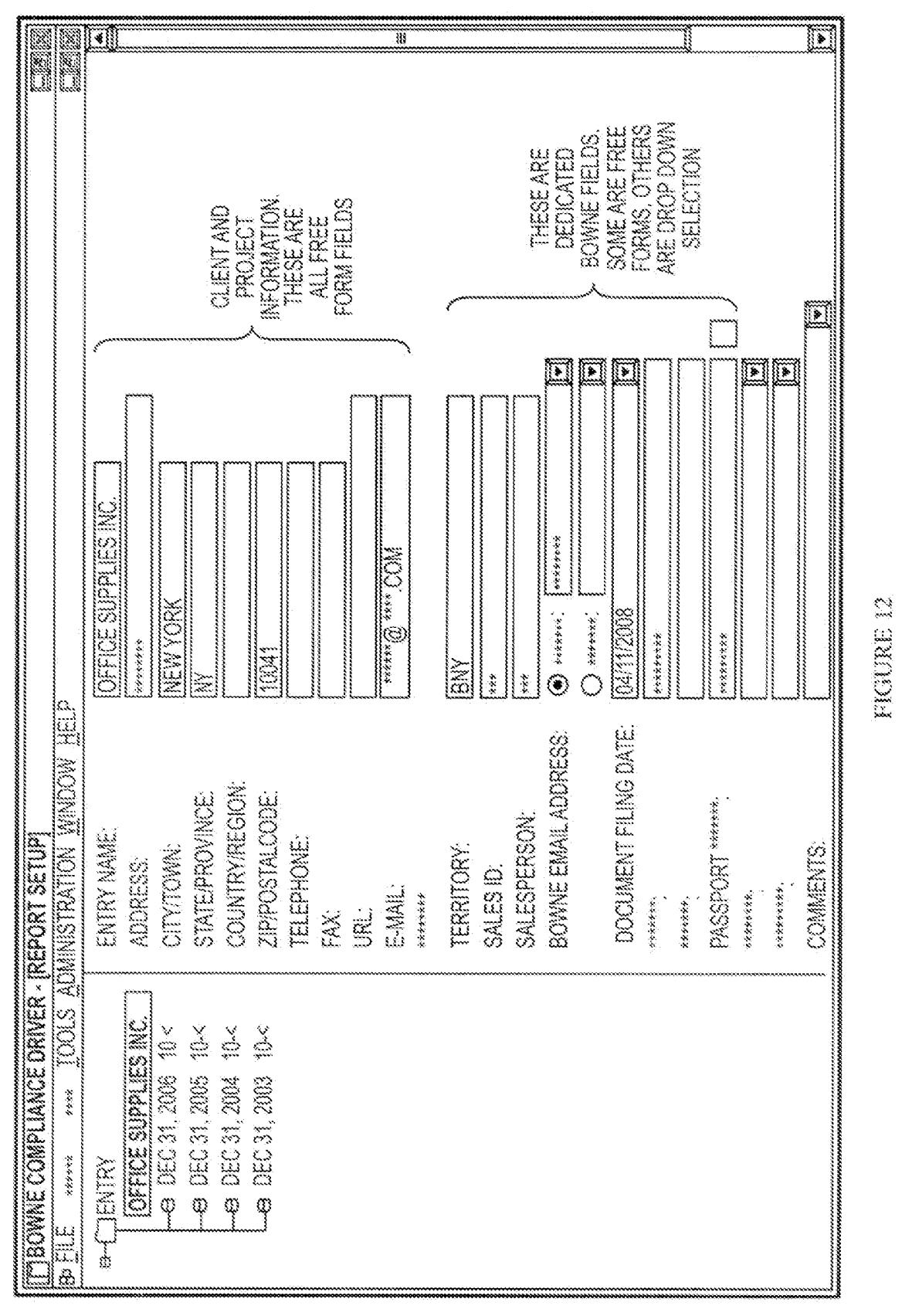
Figure 13:
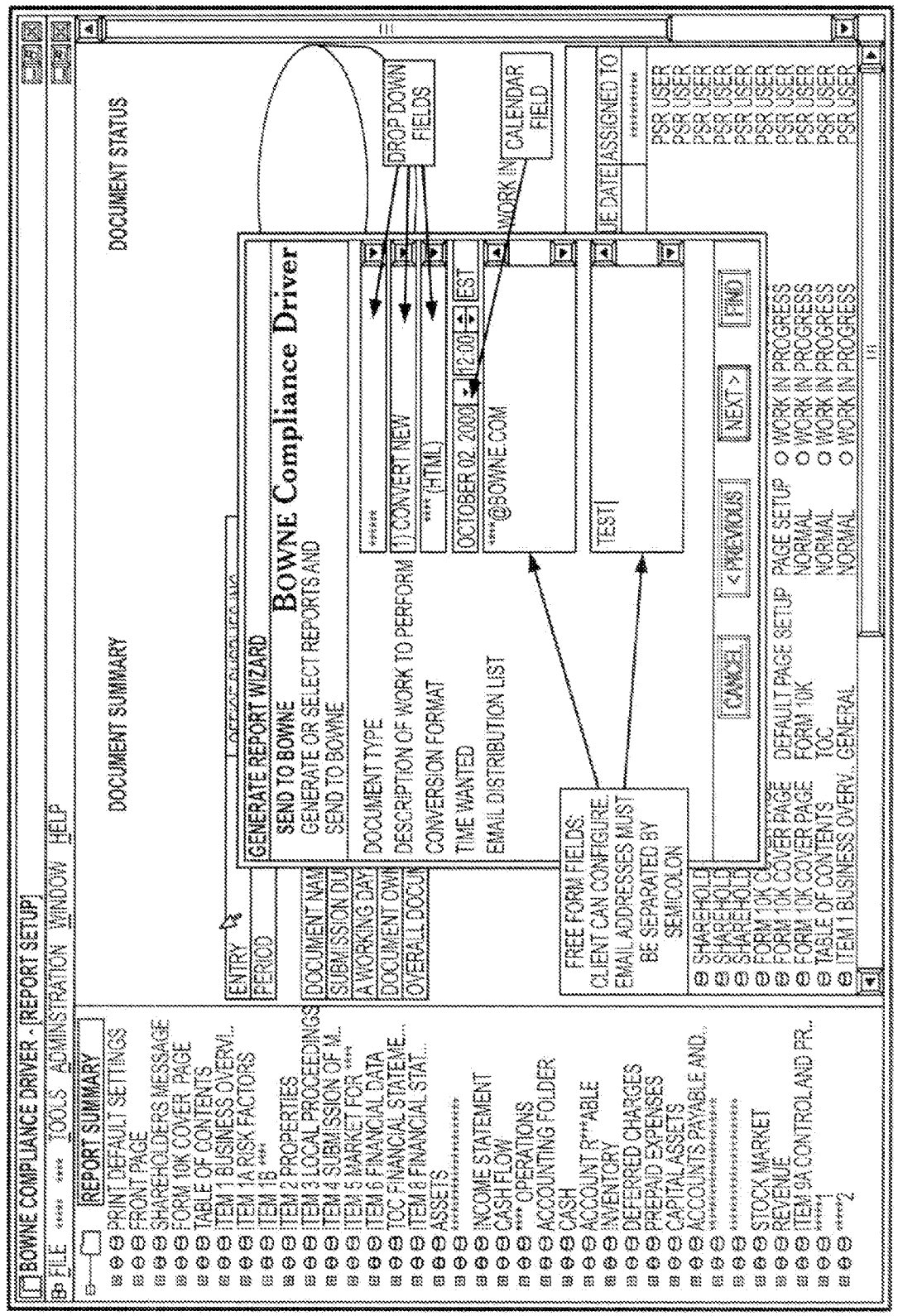
FIG. 13 is a further screen display for the client-based application.

The interface management module ("IMM") can be embedded into an application or act as a stand-alone plug-in on an individual's desktop. The IMM enables an individual at the client side to upload a document(s), insert instructions, and directly submit to the central server for typesetting, filing, production, and distribution. Documents are not limited to Financial, Compliance, nor Investment Management documents and can be any type of document that the client possesses and submits for processing and disseminating. The IMM supports all type of file extensions including, without limitation, .doc, .docx, .tif, .ai, .pdf, .qxd, .ind, etc. The client chooses from one or more drop down menus to populate and create processing instructions. Free form fields provide client flexibility to communicate further details. Examples of these input screens are presented in FIGS. 12 and 13. Specifically, in FIG. 12, fields for entering mandatory client data are provided and often include pre-set entries designed for that client's location. As seen in this Figure and in FIG. 13, the corporate assignee, Bowne Inc. is the illustrative Production Facility and manager and the illustrative IMM is the Bowne Compliance Driver. These entered instructions (metadata) populate an xml instance that controls the information. A Passport xsd file identifies the client, production system product and service, and initiates a workflow process.

In one embodiment, there are multiple connection paths available from the client side to the production facility. The first to be discussed here is a Web Portal, comprising an Internet accessible web site connected to a server for facilitating data transfer. The Web Portal includes one or more separate screens (typically individual web pages) with a mix of data entry fields and instructions to facilitate data collection on the form.

In the Web Portal, the web form screens are used to collect the information necessary for the production facility to process the document(s) ("the corporate data file") being submitted by the user. That information includes, but is not limited to what the user types in the web form. For example, the user doesn't have to enter address, or contact phone every time he/she submits the documents. This information can be retrieved from the user's profile, stored in database on the production facility side. Specifically, in a case of the Web Portal, the Passport files for different clients are kept in the file storage of the server, and references to them are included into clients' profiles. When the Web Portal compiles the package for a particular client, it finds the Passport file based on information in the client's profile and includes the file in the package. Also, the web form screens perform basic business rules validation of the entered information. For example, a user can't submit document and specify the filing date/time to be in the past. After all data is collected (typed in, or retrieved from the production facility database), the Web Portal application generates the XML metadata file loading it with the collected information, and picks the appropriate Passport file based on the user's company (facility client). The two files are added to the package along with the files submitted by user—the payload files. The whole package generation happens on the Web Portal (i.e., on facility-controlled servers). The package is dropped into a uniquely named folder on a hard drive accessible by the Workflow Engine system. The Workflow Engine is then automatically notified about the received package by a small helper program.

Operation of the Web Portal can be understood more completely by reference to a series of screen images associated with the Web Portal access pages. Beginning with FIG. 5, the system user is first presented with a welcome screen and the opportunity to open a series of data entry screens through a secured link. Access is governed by the combination of an email address and previously established password, each of which is entered in the login sequence of FIG. 5. Conventional TCP/IP communication is established for each link. The confidential status of this communication is maintained by industry standard SSL (secure socket layer) protocol.

In this illustration, the requesting company is interested in creating an Edgar compliant filing using the DMS external resources for tagging and distribution. Accordingly, after a successful login, operation moves to the screen image of FIG. 6. In this screen, there are a number of data fields that are used to manage the document creation process. Fields marked with an asterisk, in this particular embodiment, are required. However, practice of the present invention can include more or less information depending on the implementation.

Continuing in FIG. 6, the first three entries ask for the client name. This field will populate automatically upon login usage. If multiple individuals within a law firm for example are servicing multiple clients and have access to multiple accounts, the law firm administrator can select from his access list to identify the client. The client matter number is a facility internal generated number to identify the client within its workflow applications. This client number allows the system to capture exact cost and provide accurate and timely invoices to the client. It provides an audit trail to monitor usage and activities. The SEC form type includes many different SEC Form Types that a public company, individual and private company must file. SEC form types can range from the most complex demutualization, IPO, or M&A to regulatory compliance documents (10K, 10Q, Proxy) to the basic filing requirement of 8-K, 13G, 13D, Forms 3, 4 and 5. In addition, this screen collects dates for "proof" and "filing." For the production process, assignments for responsible attorney and filing coordinator are collected in the next field sequence.

The next screen image, FIG. 7, depicts the upload file process used to move the key data files from the local client drive to the Web Portal server. These files are located using the browse button, for client directed upload to the Web Portal server. The Passport file discussed in more detail, infra, and the metadata file are created at the Web Portal and combined with the corporate data file as discussed above. Prior to transmission, this data is used to perform a "pre-check" process to make sure the proposed submission meets the standard associated with the selected process.

For validation for each entry in the metadata, if the element is optional and displays a value of "0" for minOccurs no data is needed to be populate. This will pass validation through the passport acceptance level. If the element is mandatory and displays a value of "1" then if the individual does not enter information, the file will fail validation. Failed validation will not halt the process, workflow changes from automation to manual intervention. This algorithm checks the financial rules, but not formatting, which is done later. Once collected and checked, the upload process may be approved.

With the foregoing information collected, the next screen confirms some of the key demographics and permits correction/edits as needed. This is shown in FIG. 8. Once formally submitted, the system triggers a response confirmation indicating a successful completion of the process. This is depicted in FIG. 9.

The technical architecture as shown above provides flexibility to integrate with any of the internal production systems and processes and does not negate nor limit accessible transmission methods from the external environment. The 360° transmission process adheres to strict security standards for all incoming and outgoing transmissions. The data and its integrity are typically processed without compromise. In a preferred arrangement, the data is not altered, encrypted, or changed in any way before processing.

The Passport file is the key identifier that provides mandatory information such as designated workflow based upon product/service identification. The Passport file is processed on the production side server. Once transmission is made, the Passport file triggers the operational workflow process. Table I below provides a typical Passport file.

TABLE I

Passport File (XML Extension)

```
<?xml version="1.0" encoding="utf-8"?>
<root>
    <client>1</client>
    <application>F544BD4A-1C3B-48ad-
    A490-EA11F73409BD</application>
    <schema>http://www.bowne.com/schemas/
    bcd/bcd2winV2.xsd</schema>
</root>
```

The Passport file is provided by the production facility during the installation process of the Compliance Driver software at the client location, and attaches itself to the bundle that also includes the document data (the "data set") for transmission. The Passport file includes the following pieces of information: the client ID, the application process to be applied to the transmitted data set, and finally, the schema; that is, a set of rules for the data set. This information is preferably transmitted using a GUID or global unique identifier to properly link the data to a specified flow path in production.

The underlying data associated with the Passport file is also presented preferably with select metadata to be associated with the project through production. A sample metadata file is presented below in Table II.

TABLE II-A

Metadata Sample XML Instance File

```
<?xml version="1.0" encoding="utf-8"?>
<WINSubmission xmlns:xsi="http://www.w3.org/2001/
XMLSchema-instance"
xmlns="urn:bne" xsi:schemaLocation="urn:bne
http://www.bowne.com/schemas/bcd/bcd2winV2.xsd">
    <application>compliancedriver</application>
    <clientName>client name appears here.</clientName>
    <timezone>CST</timezone>
    <job>
        <jobName>client name replicated from above</jobName>
        <jobTerritory>Bowne territory</jobTerritory>
        <jobTypeCode>CP0Q</jobTypeCode>
        <csr>
            <csrID>compldriver</csrID>
            <csrTerritory>bowne territory</csrTerritory>
        </csr>
        <fiscalYearEnd>09/30</fiscalYearEnd>
        <filerStatusCode>NA</filerStatusCode>
    </job>
    <salesTeam>
        <salesPerson salesTerritory="bowne territory"
        salesPersonID="4043">name</salesPerson>
    </salesTeam>
    <workOrder>
        <workOrderTerritory>bowne territory</workOrderTerritory>
        <workOrderSummary>Convert New</workOrderSummary>
        <conversionFormat>
            <format>ACE</format>
            <format>E2</format>
        </conversionFormat>
        <taskList>
            <task>Conversion</task>
        </taskList>
        <deliveryDateTime>2009-10-13T14:16:00</deliveryDateTime>
        <workOrderComments>I'm attaching XBRL. Please supply an
EDGAR submission.</workOrderComments>
    </workOrder>
    <payload>
        <requestDate>2009-10-13</requestDate>
        <filingDate>2009-10-30</filingDate>
        <csdEmail>local customer service email</csdEmail>
        <ccc-cik>0001022646</ccc-cik>
        <co-registrants>
            <code>0001022646</code>
        </co-registrants>
        <distributionEmailList>
            <email>client distribution</email>
        </distributionEmailList>
    </payload>
</WINSubmission>
```

Table II-A uses the schema data referenced within Table II-B to populate mandatory and/or optional element fields for application integration, processing and validation. Table II-A correctly repurposes the naming conventions between one application and other applications to ensure data integration. Table II-A identifies the system/application where the supplied data will populate (i.e., <application> . . . </application>). The system/application and its associated workflow are rooted within the Passport file to determine transmission means and process flow. Although the metadata within the two tables are systematically ordered, the sequence of metadata is not essential because the element naming convention is the core the data relationship. Table II-B provides the data choices contained within specific drop down menus as well as contains the underlying validation criteria for these elements.

In order for the workflow to be successful, these Tables (II-A and II-B) perform two distinct tasks: 1) define what application and transmission means and 2) validate the data based upon field requirements.

TABLE II-B

XML Schema of the Metadata File

```xml
<?xml version="1.0" encoding="utf-8"?>
<xs:schema xmlns:bne="urn:bne" xmlns:xs="http://www.w3.org/2001/XMLSchema" targetNamespace="urn:bne" elementFormDefault="qualified">
    <!-- Simple types declaration -->
    <!-- Generic long String (limited to 5000 characters) -->
    <xs:simpleType name="longStringType">
        <xs:restriction base="xs:string">
            <xs:minLength value="0"/>
            <xs:maxLength value="5000"/>
        </xs:restriction>
    </xs:simpleType>
    <!-- Generic short String (limited to 150 characters) -->
    <xs:simpleType name="shortStringType">
        <xs:restriction base="xs:string">
            <xs:minLength value="1"/>
            <xs:maxLength value="150"/>
        </xs:restriction>
    </xs:simpleType>
    <!-- Timezone - enumeration of 4 main time zones in USA-->
    <xs:simpleType name="timezoneType">
        <xs:restriction base="xs:string">
            <xs:enumeration value="EST"/>
            <xs:enumeration value="CST"/>
            <xs:enumeration value="MST"/>
            <xs:enumeration value="PST"/>
        </xs:restriction>
    </xs:simpleType>
    <!-- Application type -->
    <xs:simpleType name="applicationType">
        <xs:restriction base="xs:string">
            <xs:enumeration value="compliancedriver"/>
        </xs:restriction>
    </xs:simpleType>
    <!-- Sales Territory -->
    <xs:simpleType name="territoryType">
        <xs:restriction base="xs:string">
            <xs:length value="3"/>
        </xs:restriction>
    </xs:simpleType>
    <!-- SalesPerson ID -->
    <xs:simpleType name="salesPersonIDType">
        <xs:restriction base="xs:integer">
            <xs:pattern value="([0-9]){1,4}"/>
        </xs:restriction>
    </xs:simpleType>
    <!-- CCC or CIK -->
    <xs:simpleType name="CCC_CIKType">
        <xs:restriction base="xs:string">
            <xs:length value="10"/>
        </xs:restriction>
    </xs:simpleType>
    <!-- Fiscal year end type -->
    <xs:simpleType name="fiscalYearEndType">
        <xs:restriction base="xs:string">
            <xs:length value="5"/>
            <xs:pattern value="(0?[1-9]|1[0-2])(V)(0?[1-9]|1[0-9]|2[0-9]|3[0-1])"/>
        </xs:restriction>
    </xs:simpleType>
    <!-- Work Order Summary Type -->
    <xs:simpleType name="workOrderSummaryType">
        <xs:restriction base="xs:string">
            <xs:enumeration value="Convert New"/>
        </xs:restriction>
    </xs:simpleType>
    <!-- Email Type -->
    <xs:simpleType name="emailType">
        <xs:restriction base="bne:shortStringType">
            <xs:pattern value="^([a-zA-Z0-9_\-\.]+)@((\[[0-9]{1,3}\.[0-9]{1,3}\.[0-9]{1,3}\.)|(([a-zA-Z0-9\-]+\.)+))([a-zA-Z]{2,4}|[0-9]{1,3})(\]?)$"/>
```

TABLE II-B-continued

XML Schema of the Metadata File

```xml
        </xs:restriction>
    </xs:simpleType>
    <!-- Conversion Format -->
    <xs:simpleType name="formatType">
        <xs:restriction base="xs:string">
            <xs:enumeration value="ACE"/>
            <xs:enumeration value="HTML"/>
            <xs:enumeration value="E1"/>
            <xs:enumeration value="E2"/>
            <xs:enumeration value="DL"/>
            <xs:enumeration value="Desktop"/>
            <xs:enumeration value="WP"/>
            <xs:enumeration value="3B2"/>
            <xs:enumeration value="XBRL"/>
        </xs:restriction>
    </xs:simpleType>
    <!-- Accelerated Status Code Type -->
    <xs:simpleType name="filerStatusCodeType">
        <xs:restriction base="xs:string">
            <xs:enumeration value="AL"/>
            <xs:enumeration value="NA"/>
            <xs:enumeration value="LA"/>
            <xs:enumeration value="SR"/>
            <xs:enumeration value="UK"/>
            <xs:enumeration value="NP"/>
        </xs:restriction>
    </xs:simpleType>
    <!-- Job Type Code Type -->
    <xs:simpleType name="jobTypeCodeType">
        <xs:restriction base="xs:string">
            <xs:enumeration value="CPAN"/>
            <xs:enumeration value="CPAS"/>
            <xs:enumeration value="CPCO"/>
            <xs:enumeration value="CP10"/>
            <xs:enumeration value="CP0D"/>
            <xs:enumeration value="CP0K"/>
            <xs:enumeration value="CP0Q"/>
            <xs:enumeration value="CP11"/>
            <xs:enumeration value="CP13"/>
            <xs:enumeration value="CP15"/>
            <xs:enumeration value="CP20"/>
            <xs:enumeration value="CP40"/>
            <xs:enumeration value="CP6K"/>
            <xs:enumeration value="CP8A"/>
            <xs:enumeration value="CP8K"/>
            <xs:enumeration value="CPFD"/>
            <xs:enumeration value="CPSH"/>
            <xs:enumeration value="CPTA"/>
            <xs:enumeration value="CPIS"/>
            <xs:enumeration value="CPIR"/>
            <xs:enumeration value="CPNP"/>
            <xs:enumeration value="CPOC"/>
        </xs:restriction>
    </xs:simpleType>
    <!-- Job Type Code Type -->
    <xs:simpleType name="taskListType">
        <xs:restriction base="xs:string">
            <xs:enumeration value="AA's"/>
            <xs:enumeration value="Conversion"/>
            <xs:enumeration value="Cloning"/>
            <xs:enumeration value="Set New/Scan"/>
            <xs:enumeration value="EDGARize"/>
            <xs:enumeration value="Other"/>
        </xs:restriction>
    </xs:simpleType>
    <!-- Complex types and elements declaration -->
    <xs:complexType name="salesPersonType">
        <xs:simpleContent>
            <xs:extension base="bne:shortStringType">
                <xs:attribute name="salesTerritory" type="bne:territoryType" use="required"/>
                <xs:attribute name="salesPersonID" type="bne:salesPersonIDType" use="required"/>
            </xs:extension>
        </xs:simpleContent>
    </xs:complexType>
    <xs:element name="csr">
        <xs:complexType>
```

TABLE II-B-continued

XML Schema of the Metadata File

```xml
            <xs:sequence>
                <xs:element name="csrID" type="bne:shortStringType"/>
                <xs:element name="csrTerritory" type="bne:territoryType"/>
            </xs:sequence>
        </xs:complexType>
    </xs:element>
    <xs:element name="conversionFormat">
        <xs:complexType>
            <xs:sequence>
                <xs:element name="format" type="bne:formatType" maxOccurs="unbounded"/>
            </xs:sequence>
        </xs:complexType>
        <xs:unique name="DistinctFormat">
            <xs:selector xpath="bne:format"/>
            <xs:field xpath="."/>
        </xs:unique>
    </xs:element>
    <xs:element name="taskList">
        <xs:complexType>
            <xs:sequence>
                <xs:element name="task" type="bne:taskListType" maxOccurs="unbounded"/>
            </xs:sequence>
        </xs:complexType>
        <xs:unique name="DistinctTask">
            <xs:selector xpath="bne:task"/>
            <xs:field xpath="."/>
        </xs:unique>
    </xs:element>
    <xs:element name="co-registrants">
        <xs:complexType>
            <xs:sequence>
                <xs:element name="code" type="bne:CCC_CIKType" maxOccurs="unbounded"/>
            </xs:sequence>
        </xs:complexType>
        <xs:unique name="DistinctCoregistrant">
            <xs:selector xpath="bne:code"/>
            <xs:field xpath="."/>
        </xs:unique>
    </xs:element>
    <xs:element name="salesTeam">
        <xs:complexType>
            <xs:sequence>
                <xs:element name="salesPerson" type="bne:salesPersonType" maxOccurs="unbounded"/>
            </xs:sequence>
        </xs:complexType>
        <xs:unique name="DistinctSalespersonID">
            <xs:selector xpath="bne:salesPerson"/>
            <xs:field xpath="@salesPersonID"/>
        </xs:unique>
    </xs:element>
    <xs:complexType name="emailListType">
        <xs:sequence>
            <xs:element name="email" type="bne:emailType" maxOccurs="unbounded"/>
        </xs:sequence>
    </xs:complexType>
    <xs:complexType name="payloadDataType">
        <xs:sequence>
            <xs:element name="requestDate" type="xs:date"/>
            <xs:element name="filingDate" type="xs:date"/>
            <xs:element name="csdEmail" type="bne:emailType"/>
            <xs:element name="ccc-cik" type="bne:CCC_CIKType" minOccurs="0"/>
            <xs:element ref="bne:co-registrants" minOccurs="0"/>
            <xs:element name="distributionEmailList" type="bne:emailListType"/>
        </xs:sequence>
    </xs:complexType>
    <xs:element name="job">
        <xs:complexType>
            <xs:sequence>
                <xs:element name="jobName" type="bne:shortStringType"/>
                <xs:element name="jobTerritory" type="bne:territoryType"/>
                <xs:element name="jobTypeCode" type="bne:jobTypeCodeType"/>
```

TABLE II-B-continued

XML Schema of the Metadata File

```
            <xs:element ref="bne:csr"/>
            <xs:element name="fiscalYearEnd"
type="bne:fiscalYearEndType" minOccurs="0"/>
            <xs:element name="filerStatusCode"
type="bne:filerStatusCodeType" minOccurs="0"/>
        </xs:sequence>
    </xs:complexType>
</xs:element>
<xs:element name="workOrder">
    <xs:complexType>
        <xs:sequence>
            <xs:element name="workOrderTerritory"
type="bne:territoryType"/>
            <xs:element name="workOrderSummary"
type="bne:workOrderSummaryType"/>
            <xs:element ref="bne:conversionFormat"/>
            <xs:element ref="bne:taskList"/>
            <xs:element name="deliveryDateTime" type="xs:dateTime"/>
            <xs:element name="workOrderComments"
type="bne:longStringType" minOccurs="0"/>
        </xs:sequence>
    </xs:complexType>
</xs:element>
<!-- Root Element declaration -->
<xs:element name="WINSubmission">
    <xs:complexType>
        <xs:sequence>
            <xs:element name="application" type="bne:applicationType"/>
            <xs:element name="clientName" type="bne:shortStringType"/>
            <xs:element name="timezone" type="bne:timezoneType"/>
            <xs:element ref="bne:job"/>
            <xs:element ref="bne:salesTeam"/>
            <xs:element ref="bne:workOrder"/>
            <xs:element name="payload" type="bne:payloadDataType"
minOccurs="0"/>
        </xs:sequence>
    </xs:complexType>
</xs:element>
</xs:schema>
```

XML schema variations are based upon individual production facility products or services; however, the xml schema will contain parallel metadata fields as displayed above that instructs workflow departments, captures and monitors workflow activities, and invoices and price work accordingly without manual intervention or administrative task.

In the foregoing metadata file, select metadata fields have been referenced. The declaration of fields provides a top level element (parent name) where as it identified the component. The element defines the name, the associated type of information that it will accept and its' constraints. The element field names correspond and synch with our workflow application. Table III, below, provides an illustrative declaration for these fields:

TABLE III

XML Element Declaration (WIP)

```
<!-- Elements declaration -->
<xs:element name="bcdSubmission">
<xs:element name="jobName" type="bne:shortStringType"/>
<xs:element name="territory" type="bne:territoryType"/>
<xs:element name="jobtypeCode" type="bne:documentCodeType"/>
<xs:element name="salesID" type="bne:salesPersonIDType"/>
<xs:element name="salesperson" type="bne:shortStringType"/>
<xs:element name="duedate" type="bne:timeWantedType"/>
<xs:element name="workordersummary"
type="bne:workDescriptionType"/>
<xs:element name="conversionFormat"
type="bne:conversionFormatType"/>
<xs:element name="clientID" type="xs:integer" minOccurs="0"/>
```

TABLE III-continued

XML Element Declaration (WIP)

```
<xs:element name="fiscalyearend" type="xs:date" minOccurs="0"/>
<xs:element name="ccc-cik" type="bne:CCC_CIKType"
minOccurs="0"/>
<xs:element name="emailDistributionList"
type="bne:emailListType" minOccurs="0"/>
<xs:element name="comments" type="bne:longStringType"
minOccurs="0"/>
```

As noted above, production facility Workflow Engine is notified about the incoming packages by a small helper program. The helper program sends a message to the Workflow Engine, containing a reference to the uniquely named folder on a hard drive, where the package was dropped by the receiving channel. Being invoked by the message from the helper program, the Workflow Engine accesses the folder referenced in the message. Based on the Passport file found in the folder, the Workflow Engine determines what internal workflow has to be initiated; then, it initiates the workflow passing the XML metadata file and all payload files to the first step of the workflow. A workflow may contain one or more steps, each performing a finite business task in the payload files processing. During its execution, a step can use data from the Passport file, from the XML metadata file, communicate with other production systems, send notification emails to human participants of the process, produce intermediate files, and even start other workflows, if needed.

In lieu of Web Portal access, information can be transmitted using a second path. Beginning with FIG. 10, a second conduit is described to transmit document data and control information to a production facility. Known as the Compliance Driver application, this conduit is standalone software that sits on the client side providing embedded intelligence to make sure that the data set is complete and includes all the proper instructions before transmission to the production facility takes place.

In the Compliance Driver application, the collection and basic validation of user data and files happens in the standalone software that sits on the client side. During the first installation, the software requests a Passport file that it will use for the submission package preparation. The Passport files are distributed by the facility manager on per client workstation basis. When used, the Compliance Driver application is responsible for generating the XML metadata file, and loading it with the collected data. When the submission package is prepared, the application adds the XML metadata file, and the pre-installed Passport file to the package. The Compliance Driver application then sends the package to the production facility by email, bypassing the Web Portal completely. When the email with embedded package is received on the production facility side, the package is automatically extracted, and is dropped into a uniquely named folder on a hard drive accessible by the local Workflow Engine system. The Workflow Engine is then automatically notified about the received package by a small helper program.

Figure 10:
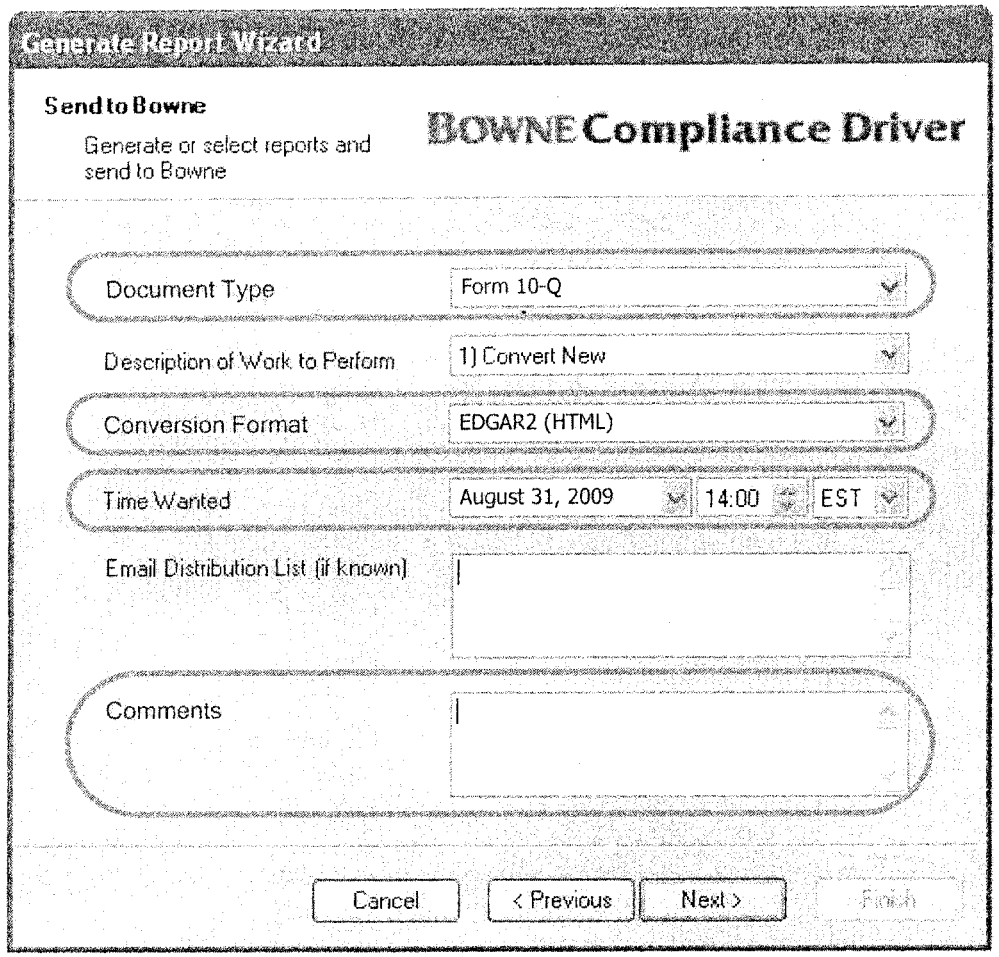

Similar to the Web Portal approach, the Compliance Driver includes a series of screens for collecting key data and preparing for submission to the remote server supporting the production server. In FIG. 10, this initial screen sets forth the requisite data fields for accomplishing this transmission in accordance with this embodiment. In this example, the "Document Type" is a Form 10-Q; the "Work to Perform" is a "convert new" using Edgar2 (HTML) for the "Conversion Format."

Specifically, the information collected at the client site under the guidance of the resident document link application is packaged into an email for secured delivery to the production facility.

Figure 11:
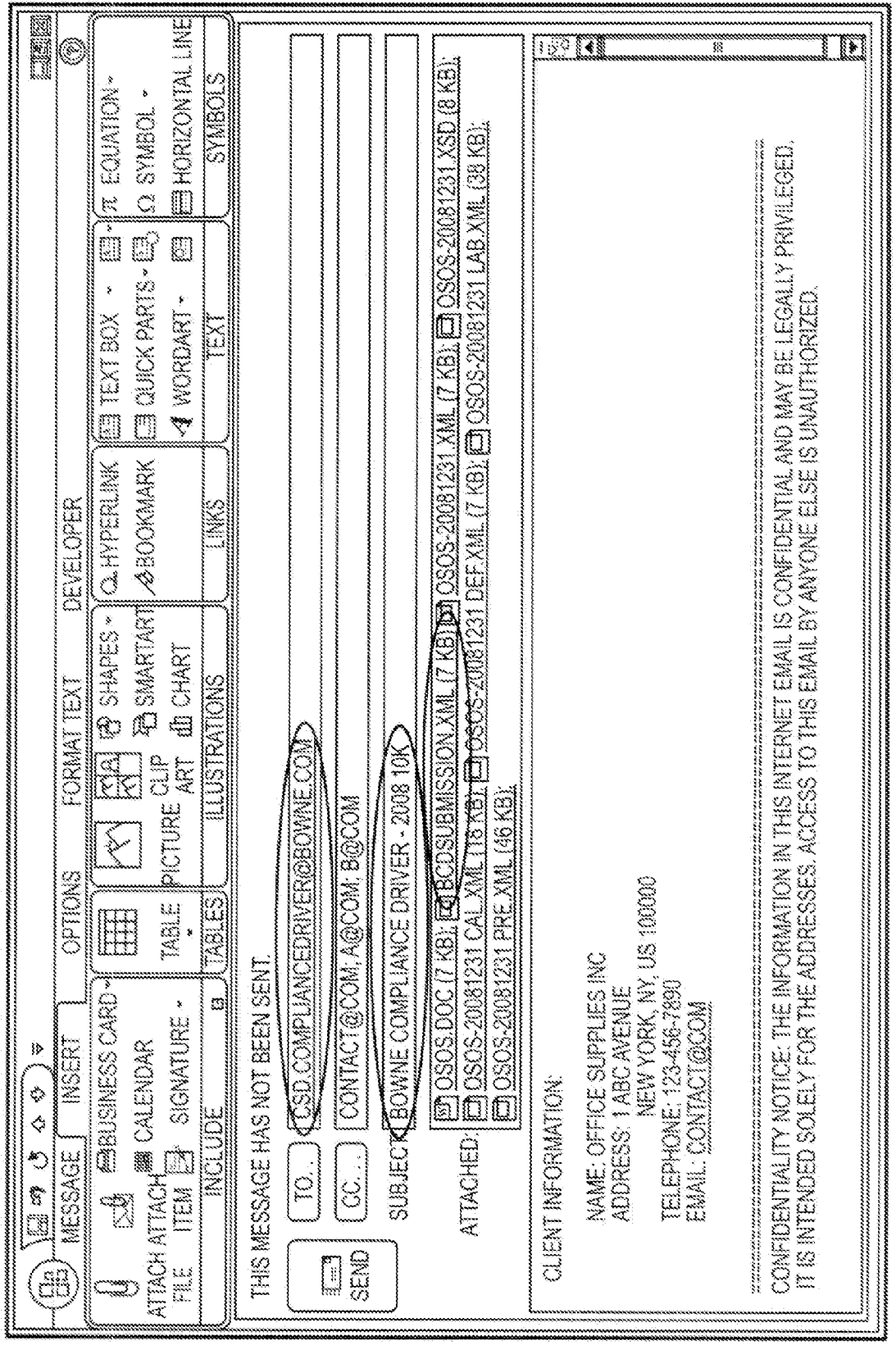

Actual transmission via email is illustrated, for example, by an Outlook-based email as depicted in FIG. 11 with core "To: compliancedriver@bowne.com" as address; a RE: line entry defining the target form (here "10 k"); and the selective attachments for implementing the appropriate process to the presented data. In Table IV below, the files appended to the email submission are described.

TABLE IV

| | File Descriptions: |
|---|---|
| osos.doc | Word Report |
| Submission.xml | BCD Submission XML (Metadata File) |
| Passport.xml | An XML file to identify client. It is unique for each client. |
| osos-20081231.xml | Instance Document |
| osos-20081232.xsd | Schema |
| osos-20081232_pre.xml | Presentation Linkbase |
| osos-20081232_def.xml | Definition Linkbase |
| osos-20081232_cal.xml | Calculation Linkbase |
| osos-20081232_lab.xml | Label Linkbase |

In the above, the Submission.xml file must be validated against schema. The XML schema for the file is not attached to the email. The XML schema in Table IV for the metadata file is not typically included in a submission package but the schema is centrally located on the production facility Internet web site, and reference to it is specified in the Passport file, (Table I); the last element of the three is called <schema>. The metadata validator program (one of the steps in the workflow) actually looks into the Passport file and uses the reference found there to pull out the XML schema, and to validate the metadata against it. In Table V below, the particular values for elements in this implementation are presented for illustration.

TABLE V

| application | Fixed. The value is always "compliancedriver" |
|---|---|
| clientName | Entity Name |
| timezone | Time zone on "Time Wanted" field |
| jobName | Entity Name |
| jobTerritory | Territory under Bowne section on Entity |
| jobTypeCode | Document Type |
| Csr | Will be left blank in this version |
| fiscalYearEnd | Report end date |
| filterStatuscode | Fixed. The value is always "NA" |
| salesperson | Information from Bowne section on Entity |
| workOrderTerritory | Territory under Bowne section on Entity |
| workOrderSummary | Fixed, only allows "Convert New" in this version |
| conversionFormat | Edgar2 (HTML) - HTML/E2 ACE - ACE/E2 |
| taskList | Fixed The value is always "Conversion" |
| deliveryDateTime | Time Wanted |
| workOrderComments | Comments |
| requestDate | Current timestamp generated by FSR |
| filingDate | Document Filing Date |
| csdEmail | Bowne Email Address |
| ccc-cik | CCC/CIK |
| co-registrants | Co-registrants CCC/CIK. Delimited by comma in FSR, but have to be separated in XML |
| distributionEmailList | Delimited by semicolon in FSR, but have to be separated in XML |

While two transmission paths have been discussed, one using a Web Portal, the second using an email facility, these are not exhaustive. A third approach provides a direct "server" to "server" link over the Internet, avoiding both Web Portal and email attributes. This is referenced below.

Figure 3:
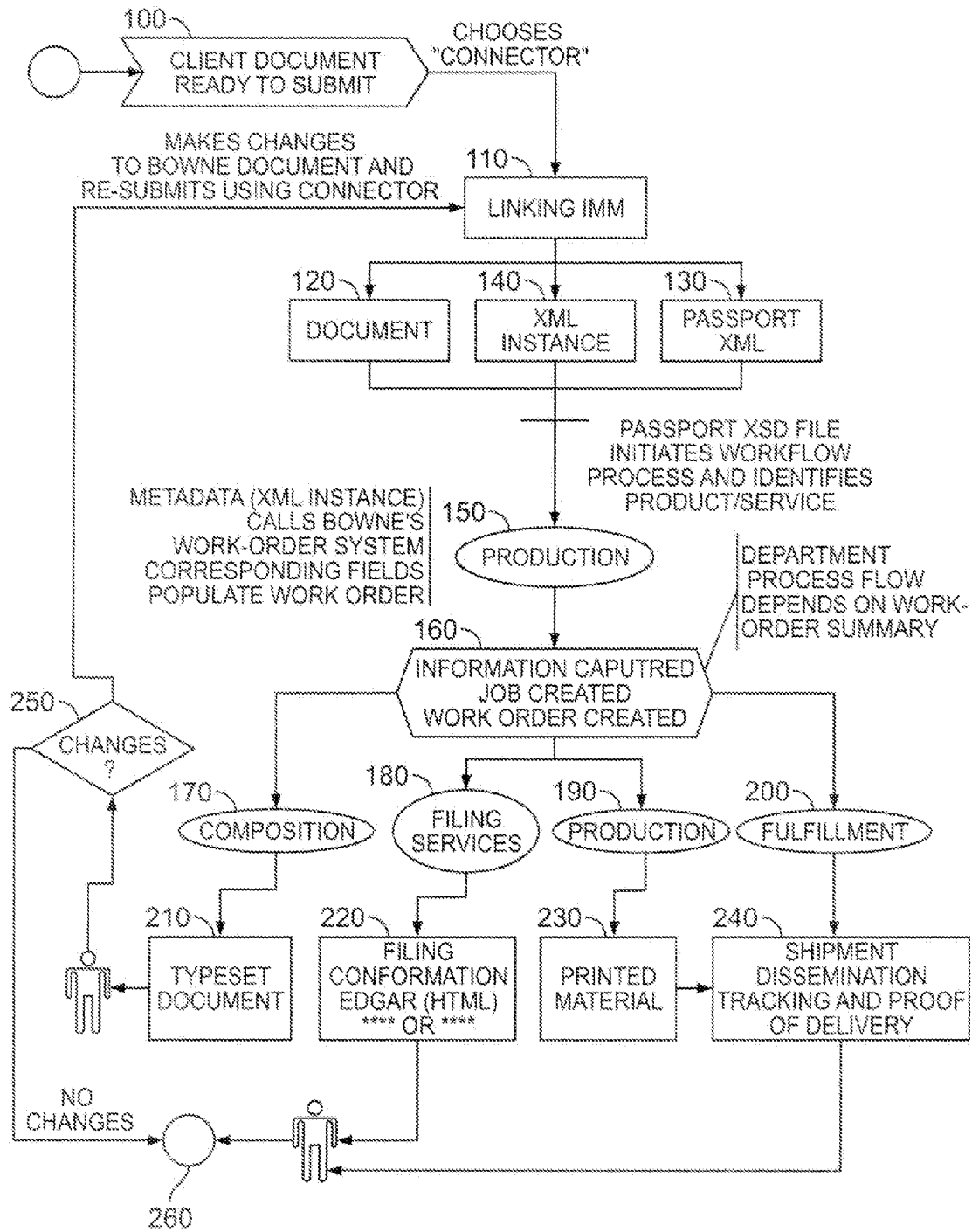

Turning now to the operation flow depicted in FIG. 3, logic begins conceptually at block 100 with this point reached when the specified data is collected into a proper document-based format and is otherwise "ready to submit." In this context, the system user, working on a client computer, initiates the local application Compliance Driver IMM. The IMM operates as described above and three separate files are prepared for transmission to a remote product facility, block 110.

Logically continuing beyond block 110, the three files include the "document," block 120, holding the company specific data, the Passport xsd file for confirming client and job processing details, block 130, and the XML instance, comprising the metadata "calls" to the work order system to populate the work order fields, block 140. Upon transmission through a secure link, these three files go into "production" at the remote facility, block 150. The interpretation of the incoming files triggers one or more of:

1. Job created
2. Work order created

Once the job created block 160 is complete, alternative/parallel paths to composition (block 170), filing service (block 180), production (block 190) and fulfillment (block 200) are provided with corresponding functional operations at block 210-240, respectively. Logic sequences look to Test 250 for any "changes," and ultimately to completion, block 260.

Figure 4:
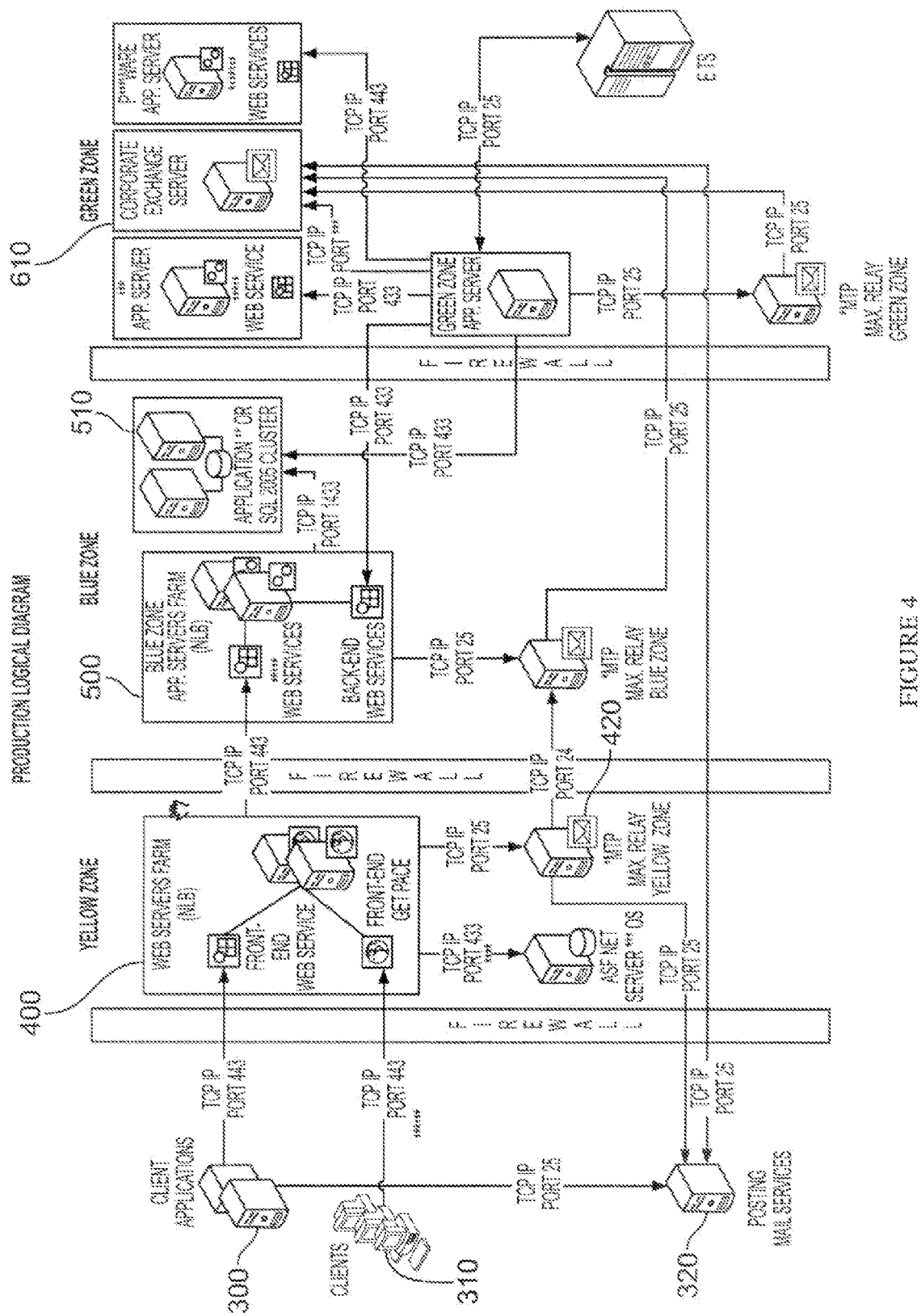

The system architecture comprises the production facility, the client side and the bridge between the two as depicted in FIG. 4. On the far left side of this diagram exists the Internet network layer separating the client from the production facility. A series of three firewalls offer staged barriers to the core "green" zone (most restrictive) and the "yellow" and "blue" zones, respectively, at the production facility.

Moving from left to right in FIG. 4, client workstations 300 and 310 operate with connections to the Internet. As noted above, a Web server farm, block 400, sits in the yellow zone and provides password protected Web Portal service for client delivery of document data (via upload process). Once entered, the processed data is passed along to the "blue" zone, application services, 500 and to application SQL cluster, block 510 to support production operations as discussed above. A separate "server" to "server" delivery channel is depicted between client server 300 and Web server form 400, with this channel operating without need for the Web Portal.

As discussed above, an email channel into production is supported "using an external secure email provider server, block 320 with email messages relayed directly to the corporate email server 610 in the "green" zone".

Not shown, but logically connected to the green zone, is the SEC server configured to receive properly formatted, conformed and "tagged" financial documents in compliance with current SEC protocols.

As the virtual business environment further evolves, facilitated communication is essential for processing and guiding information over secure and reliable channels to remote document management systems. The Compliance Driver and IMM may be utilized for most document-based products and services, including non-financial document management.

While the invention has been particularly shown and described with reference to a preferred embodiment, it will be understood by those skilled in the art that various changes in form and detail may be made therein without departing from the spirit and scope of the invention.

The following claims use terms that should be given their ordinary and accustomed meaning and other terms that have a meaning that is readily understood to persons skilled in the art of the invention in view of the specification. Nothing in this patent specification should be construed as a disclaimer of subject matter including elements in any claim that also reside in the prior art. In construing the following claims, care should be taken to construe the claim as a whole and nothing in the patent specification should be construed as a surrender of the fair inclusion of equivalents for specific elements in the claims under appropriate circumstances as controlled by the judicial doctrine of equivalents.

What is claimed is:

1. A computer implemented method comprising:
   obtaining, via one or more processors, a data set representing attributes of one or more documents on behalf of a client;
   obtaining a passport file associated with the client, wherein the passport file includes a
      client identifier, an XML schema designation, and a workflow designation;
   obtaining the XML schema designated within the passport file;
   generating a metadata file based on the data set and the XML schema;
   validating the metadata file against requirements defined by the XML schema;
   generating a document production package including the passport file, the metadata
      file, and one or more client data files; and
   transmitting the document production package.

2. The method of claim 1, wherein the workflow designation defines one or more types of new documents to be produced based on the document production package.

3. The method of claim 1, wherein the passport file is stored in physical memory connected to the one or more processors via a communication bus.

4. The method of claim 1, wherein the XML schema is stored on a remote server remote from the one or more processors.

5. The method of claim 1, wherein the metadata file comprises at least
   one of:
      the XML schema designation;
      client information;
      application information, wherein the application information identifies the source
         application of the metadata file;
      salesperson information;
      work-order information, wherein the work-order information includes territory information and file format information;
      task list information; or
      delivery information, wherein the delivery information includes one or more of a request date, a filing
         date, a delivery date or a delivery time.

6. The method of claim 1, wherein the XML schema comprises
   definitions of at least one of:
      element names;
      element types; or
      permissible element values.

7. The method of claim 6, wherein validating the generated metadata file against requirements defined in the XML schema comprises:
   comparing each of a plurality of element values in the metadata file to the corresponding definitions in the XML schema;
   determining if each of the plurality of element values in the metadata file conforms to the corresponding definition in the XML schema; and
   if any of the plurality of element values in the metadata file do not conform to the definitions in the XML schema, stopping the automated operation of the method.

8. The method of claim 1, wherein transmitting the document
   production package comprises at least one of:
      emailing the document production package;
      transmitting the document production package via a secure communication channel; or
      transmitting the document production package via a Web Portal.

9. The method of claim 1, further comprising:
   obtaining the document production package;
   generating document production instructions based on the passport file and the metadata file, wherein the document production instructions include XML tagging instructions and at least one of:
      typesetting instructions;
      printing instructions;
      shipping instructions; or
      billing instructions;
   generating new documents, based on the one or more data files and the generated document
      production instructions; and
   disseminating the new documents based on the metadata file and the generated document production instructions.

10. The method of claim 9, wherein the workflow designation defines one or more types of new documents to be produced based on the document production package.

11. The method of claim 9, wherein the metadata file comprises at least
one of:
- an XML schema designation;
- client information;
- application information, wherein the application information identifies the source application of the metadata file;
- salesperson information;
- work-order information, wherein the work-order information includes territory information and file format information;
- task list information; or
- delivery information, wherein the delivery information includes one or more of a request date, a filing date, a delivery date or a delivery time.

12. The method of claim 9, wherein disseminating the new documents
comprises at least one of:
- printing and shipping the new documents;
- emailing the new documents; or
- electronically filing the new documents with a government agency.

13. The method of claim 9, further comprising:
generating one or more billing invoices, based on the metadata file and the document production instructions; and
sending the one or more billing invoices.

14. A system comprising a production terminal
comprising one or more processors and one or more non-transitory storage media operatively connected to
the one or more processors, the production terminal configured to implement the method of claim 1.

* * * * *